United States Patent
Albert et al.

(10) Patent No.: US 9,828,137 B2
(45) Date of Patent: Nov. 28, 2017

(54) ARTICLE AND METHOD OF MANUFACTURE OF RESILIANT STACKABLE REUSABLE CONTAINER

(71) Applicant: PITH PRODUCTS, LLC, Ashford, CT (US)

(72) Inventors: Louis Albert, Woodstock, CT (US); Lance Bouchard, Woodstock, CT (US)

(73) Assignee: PITH PRODUCTS, LLC, Ashford, CT (US)

(*) Notice: Subject to any disclaimer, the term of this patent is extended or adjusted under 35 U.S.C. 154(b) by 0 days.

(21) Appl. No.: 15/135,451

(22) Filed: Apr. 21, 2016

(65) Prior Publication Data

US 2016/0311600 A1  Oct. 27, 2016

Related U.S. Application Data

(60) Provisional application No. 62/150,332, filed on Apr. 21, 2015.

(51) Int. Cl.
| | |
|---|---|
| B65D 81/02 | (2006.01) |
| B65D 21/02 | (2006.01) |
| B65D 25/24 | (2006.01) |
| B65D 25/28 | (2006.01) |
| B65D 25/34 | (2006.01) |
| B65D 81/113 | (2006.01) |
| B65D 43/16 | (2006.01) |
| B65D 43/22 | (2006.01) |

(Continued)

(52) U.S. Cl.
CPC ......... B65D 21/0223 (2013.01); B65D 25/24 (2013.01); B65D 25/2841 (2013.01); B65D 25/34 (2013.01); B65D 43/167 (2013.01); B65D 43/22 (2013.01); B65D 45/02 (2013.01); B65D 55/14 (2013.01); B65D 81/113 (2013.01); B65D 2543/00296 (2013.01); B65D 2543/00314 (2013.01); B65D 2543/00851 (2013.01); Y02W 30/807 (2015.05)

(58) Field of Classification Search
CPC .. B65D 21/0223; B65D 25/24; B65D 43/167; B65D 81/113; B65D 85/14; B65D 45/02; B65D 43/22; B65D 25/2841; B65D 25/34; B65D 2543/00314; B65D 2543/00293; B65D 2543/00851
USPC ..... 206/6.1, 484, 484.2, 523; 220/4.01, 315, 220/324; 217/3 BC, 57, 66
See application file for complete search history.

(56) References Cited

U.S. PATENT DOCUMENTS 4,867,307 A * 9/1989 Bovee ................. A63C 11/027
  206/315.1
5,794,773 A * 8/1998 Moyer ................. A63B 47/007
  206/315.91

(Continued)

Primary Examiner — Luan K Bui
(74) Attorney, Agent, or Firm — Damian Wasserbauer, Esq.; Wasserbauer Law LLC

(57) ABSTRACT

An article of manufacture and process for manufacturing a reusable stackable resilient container formed from lightweight materials and coated with a polyurea coating to provide structural support. An article of manufacture may be formed in the various dimensions and shape to enclose items and objects that are delicate and of high-value for shipping. The reusable stackable resilient container has advantages of a long service life, less weight, a lower cost of production, impact-resistant, impervious to environmental factors and other improved characteristics.

3 Claims, 4 Drawing Sheets

(51) Int. Cl.
  *B65D 45/02*       (2006.01)
  *B65D 55/14*       (2006.01)

(56) References Cited

U.S. PATENT DOCUMENTS

| | | | | |
|---|---|---|---|---|
| 5,829,586 A | * | 11/1998 | Mermell | A45C 5/04 |
| | | | | 206/317 |
| 5,875,916 A | * | 3/1999 | Crockett, Sr. | A45C 13/008 |
| | | | | 206/523 |
| 7,896,182 B1 | * | 3/2011 | Hansen | B65D 11/1873 |
| | | | | 220/4.31 |
| 2001/0015332 A1 | * | 8/2001 | Flynn | A45C 5/02 |
| | | | | 206/523 |
| 2011/0068035 A1 | * | 3/2011 | Egan | B65D 19/18 |
| | | | | 206/523 |
| 2014/0190976 A1 | * | 7/2014 | Imbrecht | B65D 88/74 |
| | | | | 220/592.01 |

* cited by examiner

ARTICLE AND METHOD OF MANUFACTURE OF RESILIANT STACKABLE REUSABLE CONTAINER

CROSS-REFERENCE TO RELATED APPLICATION

This application claims the benefit of U.S. Provisional Patent Application No. 62/150,332 filed Apr. 21, 2015 entitled "ARTICLE OF MANUFACTURE REUSABLE CONTAINER". The patent applications identified above are incorporated here by reference in its entirety to provide continuity of disclosure.

FIELD OF THE INVENTION

This invention relates to the field of packaging for the shipment of fragile and/or high-value items and, more particularly, for an improved foam container with a polyurea coating having a long service life, less weight, a lower cost of production, impact-resistant, impervious to environmental factors, and that formed in various dimensions and shapes of such items.

BACKGROUND OF THE INVENTION

The shipment of fragile and/or high-value items remains an area where improvements are needed to the many ways to package, ship and store objects because once the container leaves the vendor numerous events could happen to damage the contents of such fragile and/or high-value items. For example, precision elongated tubing (e.g. hydraulic lines) may be shipped in 4-10 foot elongated boxes; however such boxes are easily damaged (e.g. susceptible to being bent or degradation from environmental factors if left outside during shipping) because containers of conventional material such as wood and/or cardboard with wrappings including inflated air wraps (commonly called bubble wrap) typically do not protect sufficiently and there is loss in the shipment of the goods. Accordingly, there is a need for a container the exterior is hardened so that it is it resist damage to the interior parts having a foam insert providing protection to elongated and delicate items that is of a lower cost to ship (i.e. lightweight), durable (e.g. so that it can be reused).

Moreover, the additional weight of wood increases the shipping cost. In another example, aircraft engines may be manufactured and shipped around the world by air freight. Typically, such aircraft engines have been loaded into wooden transport boxes. A wood crate can produce splinters during shipment and handling by equipment resulting foreign object's destruction (FOD) if a chunk of wood falls off. Foreign object damage may cause the product to be overhauled prior to use, recertification, structural damage, and other costs may be incurred because such splinters find their way into the engine during shipment unbeknownst to the customer receiving the goods.

For at least these reasons, various approaches have been made to strengthen structural elements of the container and provide resistance to environmental conditions. For example, one approach has been to use containers in a variety of steel shapes. However, steel or other suitable metals used for reinforcing the container structural elements are subject to corrosion and add considerable weight and cost to the shipment. At times, the shipments will remain outdoors or subject to environmental conditions which may allow the ship products to corrode, deteriorate or other undesirable damage. In addition, while other containers have been considered, these materials bring about other difficulties, such as delamination, less ductility, or higher cost.

There is a need for improved containers having a less weight, which allows for more containers per payload and reduces item shipment costs. For example, in the specific application of the transportation of high-value goods that vary in dimension and shape there is a need for an improved container to securely transport fragile and/or high-value items and maintain these from breakage due to impact of the container with other objects. There also is a need for container comprised of a composite structure including a first layer of polyuria deposited on a second layer of foam material that encompasses these objects to provide a resilient, durable, ability to withstand environmental factors of water, dust, grime as well as other industries concerns such as, for example, foreign object damage (FOD) from wood chips or other objects in conventional shipping containers that may make their way into the high life and value item like an aircraft engine. Accordingly, the present invention provides an improved container that addresses all of these factors.

SUMMARY OF THE INVENTION

It is an object of the present invention to provide an article of manufacture in the form of a container coated with polyurea material by spray application on the surface of the foam, wood, cardboard and composite materials of the container making the container water resistant, safer, and lighter and having improved impact resistance. A container coated with polyurea material by spray application so as to add approximately between 0.03 and 0.125 inch thickness of polyurea coating to these materials can increase the structure and durability of these materials.

Is an object of the present invention to provide a process to manufacturing the article of manufacture to create an improved container with the coating structurally enhancing the product with the product being manufactured at a lower cost than other containers by eliminating the need for a mold.

The process of manufacturing article of the reusable container according to the present invention also provides freedom of shape and size for lower manufacturing quantities and a large cost and weight advantage over conventional containers in different categories such as unit cost of manufacture, cost of shipment based upon weight, and other economic factors based upon materials needed to form the container as well as the resulting weight of the finished article of manufacture.

Another object of the present invention is to make a container having the advantage of being lighter than a conventional shipping crate with its construction using foam as the main structure or by eliminating reinforcing structural members typically involved in wood containers eliminating weight and decreases issues in the work place.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Description of the Embodiments, which is to be read in association with the accompanying drawings, which are incorporated in and constitute a part of this specification, show certain aspects of the subject matter disclosed herein and, together with the description, help explain some of the principles associated with the disclosed implementations, wherein.

DESCRIPTION OF THE EMBODIMENTS

Figure 1:
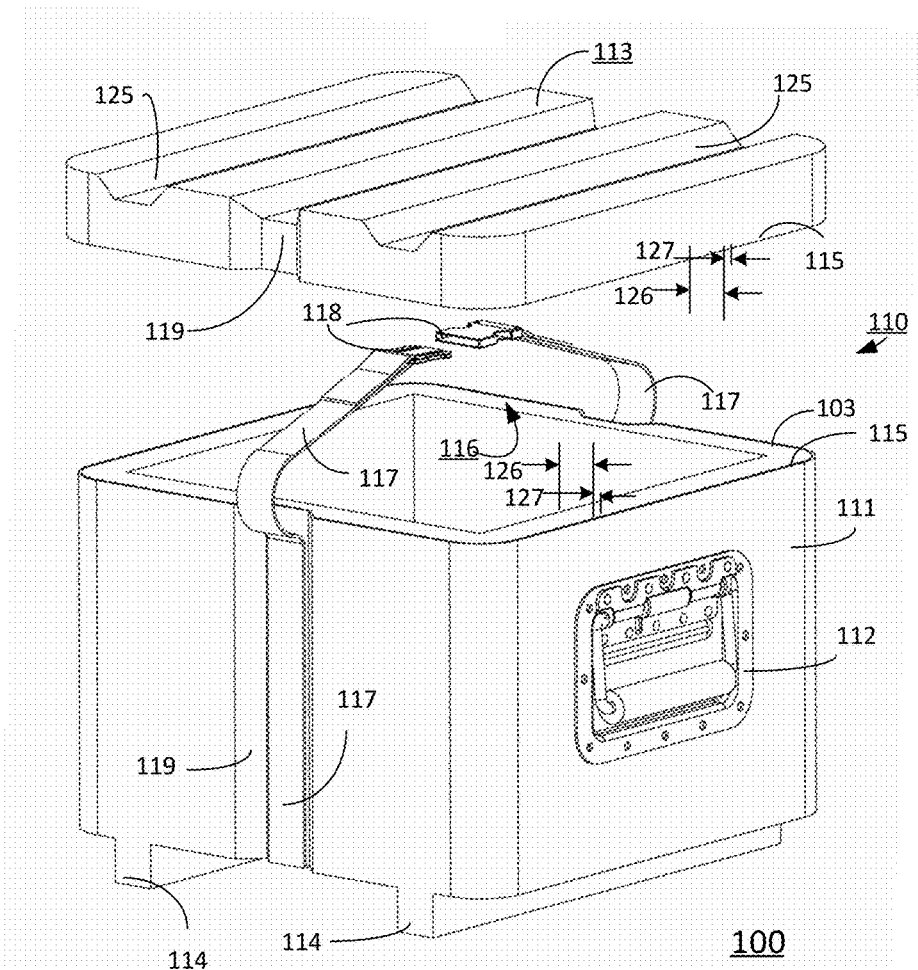
FIG. 1 is a perspective expanded view illustrating a resilient stackable reusable container of the article and method of manufacture according to an embodiment of the present invention.

Non-limiting embodiments of the present invention will be described below with reference to the accompanying drawings, wherein like reference numerals represent like elements throughout. While the invention has been described in detail with respect to the preferred embodiments thereof, it will be appreciated that upon reading and understanding of the foregoing, certain variations to the preferred embodiments will become apparent, which variations are nonetheless within the spirit and scope of the invention.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "some embodiments", "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are provided for the purposes of illustrating some embodiments of the present invention, and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

Unless otherwise indicated, all numbers expressing quantities of size, amount, elongation percentage, tensile strength, reaction conditions, and so forth used in the specification and claims are to be understood as being modified in all instances by the term "about." Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of size, weight, concentration, time, or percentage is meant to encompass variations of, in some embodiments ±20%, in some embodiments ±10%, in some embodiments ±5%, in some embodiments ±1%, and in some embodiments ±0.1% from the specified amount, as such variations are appropriate to perform the disclosed methods.

The term "and/or" when used to describe two or more activities, conditions, or outcomes refers to situations wherein both of the listed conditions are included or wherein only one of the two listed conditions are included.

The term "comprising," which is synonymous with "including," "containing," or "characterized by" is inclusive or open-ended and does not exclude additional, un-recited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

As used herein the term "coated" or "coating" refers to a layer, coat, covering, film, sheet, veneer of any substance spread over a surface. According to an embodiment of the invention, As used herein the term "container" refers to an object that can be used to hold or transport something of a standard design and size used for the transportation of goods by road, rail, sea, or air.

As used herein the term "polyurea" "polyuria" or "polyurethane" refers to a polymer comprising multiple urea bonds (i.e., bonds having the structure —NR—C(=O)—NR—, wherein R is H, alkyl, or aryl). "Sprayable polyurea" refers to polymers and compounds with the polyurethane chain suitable for use in a polyurea layer of material to coat will now on at least one surface (i.e., foam, cardboard, composite materials, wood reinforced panels or other surface of the article of manufacture) of the container by spray application according to embodiments of the invention. Polyureas can be formed by the reaction of isocyanate-terminated prepolymers and amine-containing components (e.g., amine-terminated polymer resins, amine-terminated oligomers, or amine-containing monomers).

The term "isocyanate" refers to the group —N=C=O.

The term "amine" refers to the group —NR'R", wherein R' and R" are independently H, alkyl, or aryl. "Primary amines" are compounds wherein both R' and R" are H. "Secondary amines" are compounds wherein one of R' and R" is H and the other is alkyl or aryl.

As used herein, the term "alkyl" refers to C1-20 inclusive, linear (i.e., "straight-chain"), branched, or cyclic, saturated or at least partially and in some cases fully unsaturated (i.e., alkenyl and alkynyl) hydrocarbon chains, including for example, methyl, ethyl, propyl, isopropyl, butyl, isobutyl, tert-butyl, pentyl, hexyl, octyl, ethenyl, propenyl, butenyl, pentenyl, bexenyl, octenyl, butadienyl, propynyl, butynyl, pentynyl, hexynyl, heptynyl, and allenyl groups. "Branched" refers to an alkyl group in which a lower alkyl group, such as methyl, ethyl or propyl, is attached to a linear alkyl chain. "Lower alkyl" refers to an alkyl group having 1 to about 8 carbon atoms (i.e., a C1-8 alkyl), e.g., 1, 2, 3, 4, 5, 6, 7, or 8 carbon atoms. "Higher alkyl" refers to an alkyl group having about 10 to about 20 carbon atoms, e.g., 10, 11, 12, 13, 14, 15, 16, 17, 18, 19, or 20 carbon atoms. In certain embodiments, "alkyl" refers, in particular, to C1-8 straight-chain alkyls. In other embodiments, "alkyl" refers, in particular, to C1-8 branched-chain alkyls.

Alkyl groups can optionally be substituted with one or more alkyl group substituents, which can be the same or different. The term "alkyl group substituent" includes but is not limited to alkyl, halo, arylamino, acyl, hydroxyl, aryloxyl, alkoxyl, alkylthio, arylthio, aralkyloxyl, aralkylthio, carboxyl, alkoxycarbonyl, oxo, and cycloalkyl. There can be optionally inserted along the alkyl chain one or more oxygen, sulfur or substituted or unsubstituted nitrogen atoms, wherein the nitrogen substituent is hydrogen, lower alkyl (also referred to herein as "alkylaminoalkyl"), or aryl.

The term "aryl" is used herein to refer to an aromatic substituent which can be a single aro-matic ring or multiple aromatic rings which are fused together, linked covalently, or linked to a common group such as a methylene or ethylene moiety. The common linking group can also be a carbonyl as in benzophenone or oxygen as in diphenylether or nitrogen in diphenylamine. The aromatic ring(s) can include phenyl, naphthyl, biphenyl, diphenylether, diphenylamine and ben-zophenone among others. In particular embodiments, the terra "aryl" means a cyclic aromatic comprising about 5 to about 10 carbon, atoms, including 5- and 6-membered hydrocarbon and heterocyclic aromatic rings, The aryl group can be optionally substituted with one or more aryl group sub stituents which can be the same or different, where "aryl group substituent" includes alkyl, aryl, aralkyl, hydroxy, alkoxyl, aryloxy, aralkoxyl, carboxy, acyl, halo, nitro, alkoxycarbonyl, aryloxycarbonyl, aralkoxycarbonyl, acyloxyl, acylamino, arcylamino, carbamoyl, alkylcarbamoyl, dialkylcarbamoyl, arylthio, alkylation, alkylene and —NR'R", where R' and R" can be each independently hydrogen, alkyl, aryl and aralkyl. Specific examples of aryl groups include but are not limited to cyclopentadienyl, phenyl, furan, thiophene, pyrrole, pyran, pyridine, imidazole, isothiazole, isoxazole, pyrazole, pyrazine, pyrimi-dine, and the like.

As used herein, a "monomer" refers to a molecule that can undergo polymerization, thereby contributing constitutional units (i.e., an atom or group of atoms) to the essential structure of an oligomer or polymer.

An "oligomer" refers to a molecule of intermediate relative molecular mass, the structure of which comprises a small plurality of units (e.g., between about 2 and about 10 repeating units) derived from molecules of lower relative molecular mass.

A "polymer" refers to a molecule comprising a plurality of repeating units derived from smaller molecules (e.g., monomers or oligomers). In some embodiments, the polymer has more than 10 repeating units, more than 25 repeating units, more than 50 repeating units, or more than 100 repeating units. In some embodiments, a polymer can have more than 1,000, more than 5,000, more than 10,000, more than 50,000, more than 100,000 repeating units, or more than 250,000 repeating units.

A "copolymer" refers to a polymer derived from more than one species of monomer.

The term "prepolymer" refers to a monomer, oligomer or short chain polymer with reactive terminal groups (e.g., epoxy, ester, carboxylic acid (or carboxylate), hydroxyl, vinyl, or amine groups) that can react to form a larger (e.g., higher molecular weight) polymer or copolymer. In some embodiments, "short chain polymer" refers to a polymer with 1,000 repeating units or less (e.g., 1,000, 750, 500, 400, 300, 200, 150, 100, 75, 60, 50, 40, or 30 repeating units or less). In some embodiments, a short chain polymer has molecular weight of less than 10,000 g/mol (e.g., less than 10,000, 7,500, 5,000, 4,000, 3,000, 2,000, or 1,000 g/mol).

The term "resin" or "polymer resin" as used herein refers to a composition comprising one or more polymeric, oligomeric or monomeric materials that can be hardened by polymerization. Thus, in some embodiments, a resin is a viscous liquid composition that can be polymerized to form a solid. Suitable resins include, but are not limited to, epoxy resins, vinyl ester resins, polyester resins and methylmethacrylate resins.

In accordance with various embodiments of the present invention, a composite re-useable container that may be formed in various dimensions and shapes of the high-value items and/or delicate objects is provided. The composite materials and construction in accordance with some embodiments of the disclosed subject matter includes (1) a first layer of a foam polymer having a predetermined thickness and arranged in the container shape; and (2) a second polyurea layer formed on at least one surface, such as an outer surface, of the foam portions. The composite materials and construction in accordance with an additional construction of the disclosed subject matter includes a support plate for attachments of a hinge, latch for the lid and handles utilized by persons in grabbing, lifting and transportation functions. The composite material and construction provides significant strength, flexibility, viscous damping, and energy dissipation. In some embodiments, the composite material can also be formed to have additional protecting properties, such as fire resistant properties, UV protective properties, or moisture resistant properties.

The composite material and construction can be used in a variety of applications. For example, the composite material can be used to reinforce structural framing elements such as the foam portions making the enclosure and the wood portions for securing hinges, latches and handles within the enclosure and/or non-structural elements to protect items and/or objects from direct impact, loading, other damage and may be suitable because of their reduced weight, protection, fire resistance, corrosion resistance, moisture resistance, and/or used to provide a particular protective property. In yet another example, the composite material can be used as a stand-alone structure that is strong, stiff, and provides significant damping, while also providing one or more protective properties, such as UV protection, fire resistance, corrosion resistance, moisture resistance, and/or reduced shipping weight by about twenty-five percent (25%) over similar conventional construction, a reduced cost of production by about thirty-three 33 percent (33%) over similar conventional construction.

Figures 2, 3:
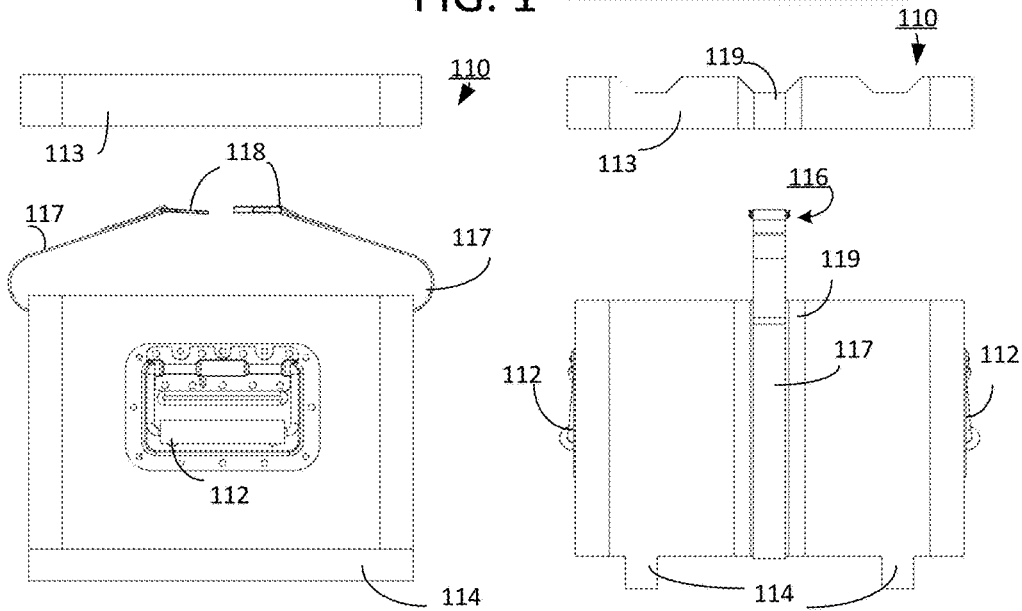
FIG. 2 is a side expanded view illustrating an integral handle of the resilient stackable reusable container according to the invention, which opposite side is of the same construction.
FIG. 3 is a front expanded view illustrating an integral fastener for the lead of the resilient stackable reusable container according to the invention, which rear view is of the same construction.

As is illustrated in FIGS. 1-14, the present invention consists of an article of manufacture in the form of a reusable container generally designated as element 100. The container 100 may be made from suitable materials 101 such as for example cardboard 102, foam 103, plastic 104, wood 105, and other lightweight metal materials 106. According to an embodiment of the present invention, the stackable container 110 may be formed in the shape of a shipping container with integral skids 114 utilizing the foam 103 structural shell and with a fastener assembly 116 (e.g. a securing strap 117 with buckle 118 configured in channel portions 119 that can be placed around the lid 113 so as to secure the lid 113 to the base 111) as is illustrated in FIGS. 1 through 3. The container with lid 110 comprises a base enclosure 111, an integral handle 112 in the base 111, a lid 113, and skids formed on the lower portion of the base 111. The base enclosure 111, lid 113, and skids 114 may be formed from a suitable foam material 103. A fastener assembly 116 comprising a strap 117 and a buckle 118 can be affixed to the side of the base enclosure 111 with suitable length to, and adapted to, extend over the lid 113 fastening there around to secure the lid 113 to the base 111.

Referring now to FIGS. 1 and 3, the article of manufacture reusable container 100 is configured in a stackable container 110 design with a base enclosure 111 and lid enclosure 113 secured by a fastener assembly 116. According to one embodiment of the present invention, reusable stackable container design 110 may be formed from a first layer portion 126 and a second polyurea layer 127 sprayed or otherwise deposited thereon hereon. The stackable container 110 design may be made from suitable materials 101 such as for example foam 103 extruded to a suitable shape or from separate pieces of appropriate dimension assembled to form the box shape of the base enclosure 111, the lid enclosure 113, and the skids 114. The stackable feature of the reusable container 110 design as the skids 114 operably coupling with the skid channels 125 disposed on the lid, whereby multiple containers may be stacked on top of each other.

The base enclosure 111 with integral skids 114, lid enclosure 113, and straps 117 can be coated with the polyurea coating 115. The polyurea coating 115 hardens and provides structural support to the foam material 103 of the base enclosure 111, skids 114 and lid 113. The straps 117 are also secured and hardened into the base enclosure 111 by the polyurea coating 115 such as, for example, the base enclosure may be oriented with the opening down, the strap 117 disposed in the channel 119 extending on the sides and base of the base enclosure 111, and then the polyurea coating may be sprayed and/or otherwise deposited onto the entire surface of the first layer portion 125 the base enclosure 111, skids 114 and straps 117 and allowed to harden. Similarly, the lid enclosure 113 may be oriented with its opening down and the polyurea coating 115 sprayed and/or otherwise deposited onto the entire surface of the first layer portion 125 of the lid enclosure 113 and allowed to harden. In this manner a resilient reusable stackable container 110 may be formed.

According to yet another embodiment of the present invention, and elongated reusable container 130 may be formed in the shape of a shipping container having an elongated shell of varying dimensions as is illustrated in FIGS. 4 through 7 suitable container shape for shipping elongated delicate items such as, for example, hydraulic lines for the aerospace industry.

According to another embodiment of the present invention, the resilient container 160 may be formed with reinforced integral handles, hinge and a lid fastener for a resilient container as is illustrated in FIGS. 8 through 14. It should be appreciated that the present invention is not solely limited to these particular designs as numerous variations in size, shape and functionality of a shipping container may utilize the principles of the present invention.

Referring to FIGS. 4 through 7, another embodiment of the article of manufacture reusable container 100 is illustrated as an elongated reusable container 130. The elongated container 130 comprises a base enclosure 131, a lid enclosure 132, an integral handle 112 in the lid 132, and a fastener assembly 134 formed integral to the base enclosure 131 and lid enclosure 132, and one or more skids 139. The base enclosure 131 and lid enclosure 132 may be joined by a hinge 135. The elongated container 130 may be formed with a lock 140 so as to secure and fasten the base enclosure 131 to the lid enclosure 132 for security (i.e. to prevent from tampering), integrity of the shipment, and/or sealing from elements during transportation. The base and lid enclosures 131, 132 may be formed from a first layer portion 127 with a second polyurea layer portion 127 deposited thereon by spraying techniques.

The handle 112, the fastener assembly 134, and hinge 135 may be formed integral to the base enclosure 131 and lid enclosure 132 comprising a tab 137 and a latch 138. The fastener assembly 134 may be fitted to cutouts in the base enclosure 111 dimension to receive the tab 137 and latch 138 assemblies in the first layer portion 126. The tab 137 and latch 138 assemblies can be affixed by suitable fasteners (i.e. screws, bolts, rivets, etc.) to the hardened composite material consisting of the first layer portion 126 covered by the second polyurea layer portion 127. According to an alternative embodiment of the present invention shown in FIG.

11, any added assemblies of the handle 112, the fastener assembly 134, and hinge 135 (and any lock 140) may be secured to a wood portion 105 dimension between any of the first layer portion(s) 126 (e.g. foam sheeting) and coated with a second polyurea layer portion 127 using suitable fasteners. To the side of the base enclosure 111 with suitable strength to, and adapted to, fastening and secure the lid 132 to the base 131.

Figure 14:
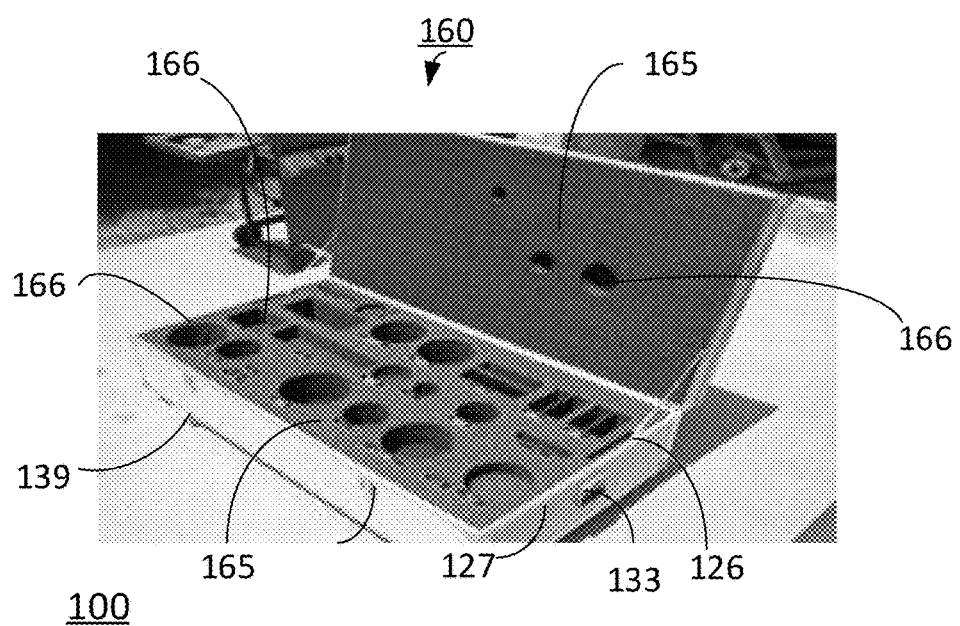
FIG. 14 is a rear view illustrating an elongated resilient stackable reusable container of the article and method of manufacture of the present invention.

As described herein, the base enclosure 131 and lid enclosure 132 can be coated with the polyurea coating 115 by spraying and/or otherwise depositing polyurea coating 115 hardens and provides structural support to the suitable material 101. In this manner the elongated reusable container 130 may be formed. The elongated reusable container 130 also may be formed with integral skids 139 useful to raise the base 131 from a surface, for handling by forklifts and other equipment, and other advantages to having skids during transportation of the elongated reusable container 130. According to yet another embodiment, the elongated container 130 may be made suitable for a transporting various tools with additional foam inserts 142 for tools and other items as is illustrated in FIG. 14. In such an embodiment, the elongated container 130 may be formed from suitable materials 101 such as for example cardboard 102, foam 103, plastic 104, wood 105, and other lightweight metal materials 106.

Figures 8, 9:
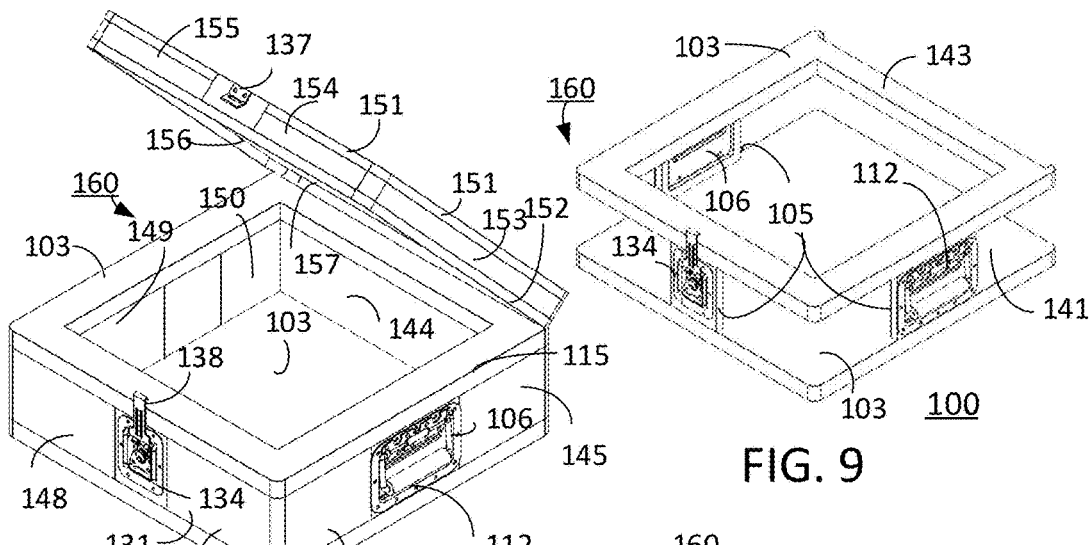
FIG. 8 is a rear view illustrating an elongated resilient stackable reusable container of the article and method of manufacture of the present invention.
FIG. 9 is a rear view illustrating an elongated resilient stackable reusable container of the article and method of manufacture of the present invention.
Figures 10, 11:
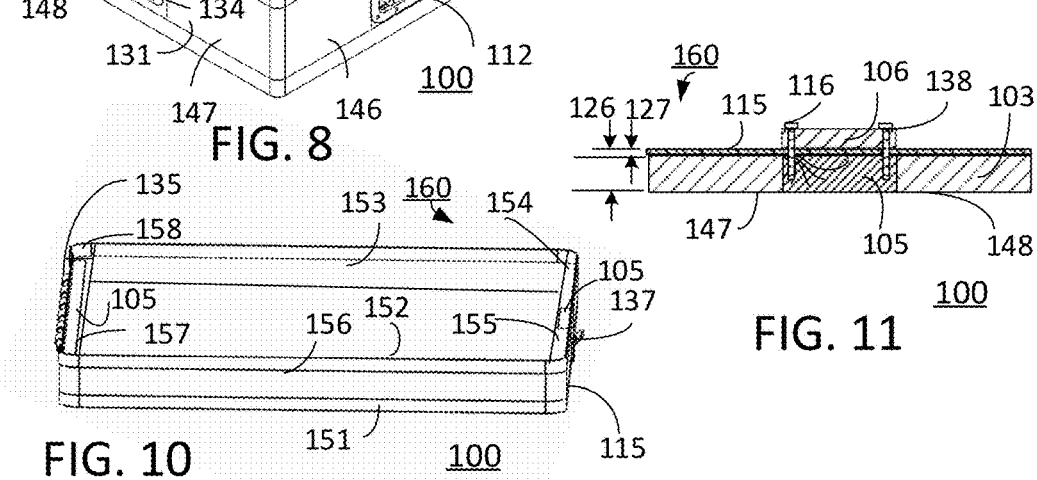
FIG. 10 is a rear view illustrating an elongated resilient stackable reusable container of the article and method of manufacture of the present invention.
FIG. 11 is a rear view illustrating an elongated resilient stackable reusable container of the article and method of manufacture of the present invention.
Figures 12, 13:
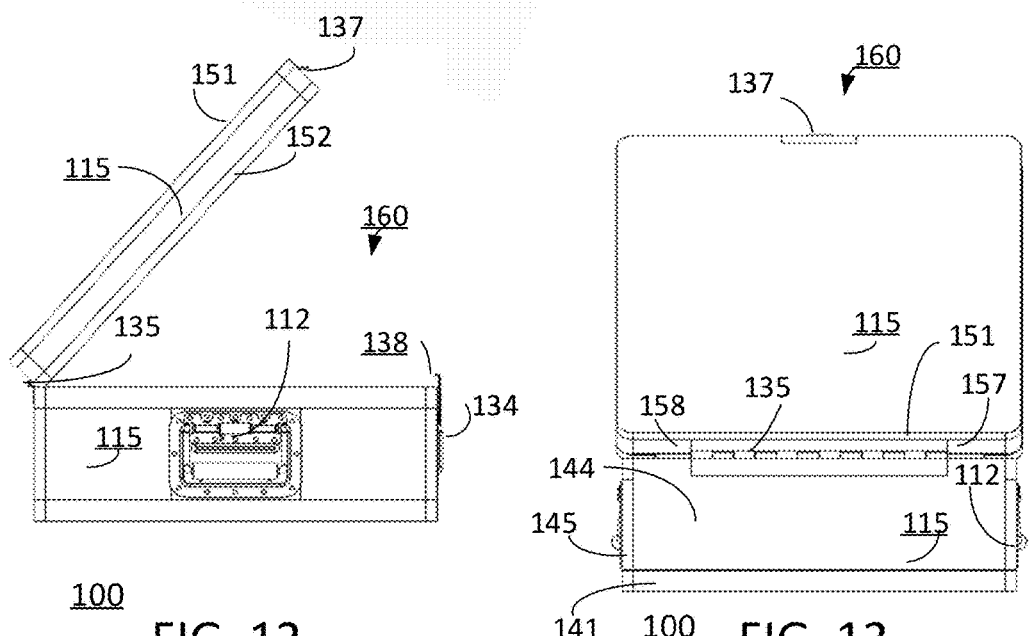
FIG. 12 is a rear view illustrating an elongated resilient stackable reusable container of the article and method of manufacture of the present invention.
FIG. 13 is a rear view illustrating an elongated resilient stackable reusable container of the article and method of manufacture of the present invention.

Referring to FIGS. 8 through 14, another embodiment of the article of manufacture reusable container 100 is illustrated as reusable container 160 may be made from suitable materials 101 such as for example foam 103 panels assembled in a container shape and coated with a polyurea coating 115 by spray application or the like. The reusable container 160 may be formed with a base enclosure 131, a lid enclosure 132, a handle 112 formed integral with a plurality of first layer portions 126 consisting of a base framing portion 141, upper framing portion 143, and side portions side portions 144, 145, 146, 147, 148, 149 and 150. As illustrated in FIG. 11, wood portions 105 may inserted between the side portions 145-146, 147-148, 149-150 and are configured to provide structural integrity for any added assemblies of the handle 112, the fastener assembly 134, and hinge 135 (and any lock 140) may be secured to a wood portion 105 dimension between any of the first layer portion(s) 126 (e.g. foam sheeting) and coated with a second polyurea layer portion 127 using suitable fasteners. According to an embodiment of the method of manufacturing the base enclosure 131, each of the base framing portion 141, upper framing portion 143, and side portions 144, 145, 146, 147, 148, 149 and 150 may be cut to the desired dimension. The base framing portion 141 and upper framing portion 143 may be assembled as is shown in FIGS. 8 and 9. Each of the wood portions 105 may be positioned and/or glued in place, for example, the base framing portion 141, and the upper framing portion 143. Each of the side portions 144, 145, 146, 147, 148, 149 and 150 may be positioned and/or glued in place, for example, the wood portions 105 disposed between the side portions 145-146, 147-148, 149-150, thereby forming essentially the first layer portion 126 of the base enclosure 131. The base enclosure 131 may be turned over and the second polyurea layer portion 127 sprayed and/or deposited thereon (with the opening side down) and allowed to harden so as to form the composite material. Any added assemblies of the handle 112, the fastener assembly 134, and hinge 135 (and any lock 140) may be secured to a desired wood portion 105 using suitable fasteners as shown in FIG. 11.

Similarly, the lid enclosure 132 may be formed from a plurality of first layer portions 126 consisting of a lid base framing portion 151, upper lid framing portion 152, and side portions 153, 154, 155, 156, 157 and 158. As illustrated in FIG. 11, a wood portions 105 may inserted between the side portions 154-155, 157-158 and are configured to provide structural integrity for any added assemblies of the latch 138 and the hinge 135 when these are secured to such wood portion 105 dimension between any of the first layer portion(s) 126 (e.g. foam sheeting) and coated with a second polyurea layer portion 127 using suitable fasteners. According to an embodiment of the method of manufacturing the lid enclosure 132, each of the lid framing portion 151, upper lid framing portion 152, and side portions 153, 154, 155, 156, 157 and 158 may be cut to the desired dimension. The lid framing portion 151 and upper lid framing portion 152 may be assembled in a similar manner as is shown in FIGS. 9 and 10. Each of the wood portions 105 may be positioned and/or glued in place, for example, the lid framing portion 151, and the upper lid framing portion 152. Each of the side portions 153, 154, 155, 156, 157 and 158 may be positioned and/or glued in place, for example, the wood portions 105 disposed between the side portions 154-155, 157-158, thereby forming essentially the first layer portion 126 of the lid enclosure 132. The lid enclosure 132 may be turned over and the second polyurea layer portion 127 sprayed and/or deposited thereon (with the opening side down) and allowed to harden so as to form the composite material. Any added assemblies of the hinge 135 and latch 138 of the fastener assembly 134 (and any lock 140) may be secured to a desired wood portion 105 using suitable fasteners as shown in FIG. 11.

Figure 4:
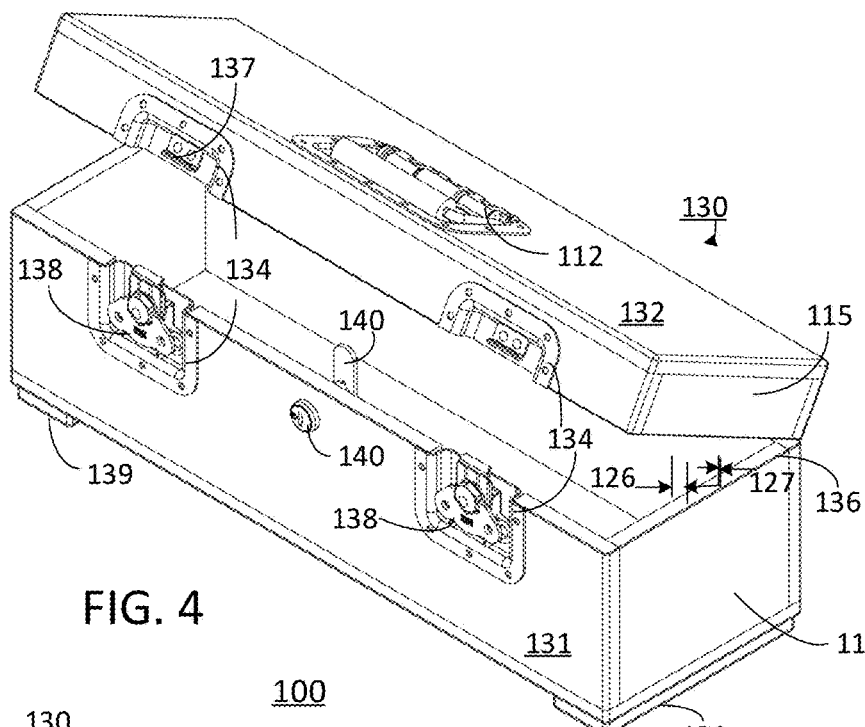
FIG. 4 is a perspective view illustrating an elongated resilient stackable reusable container of the article and method of manufacture according to an embodiment of the present invention.
Figure 5:
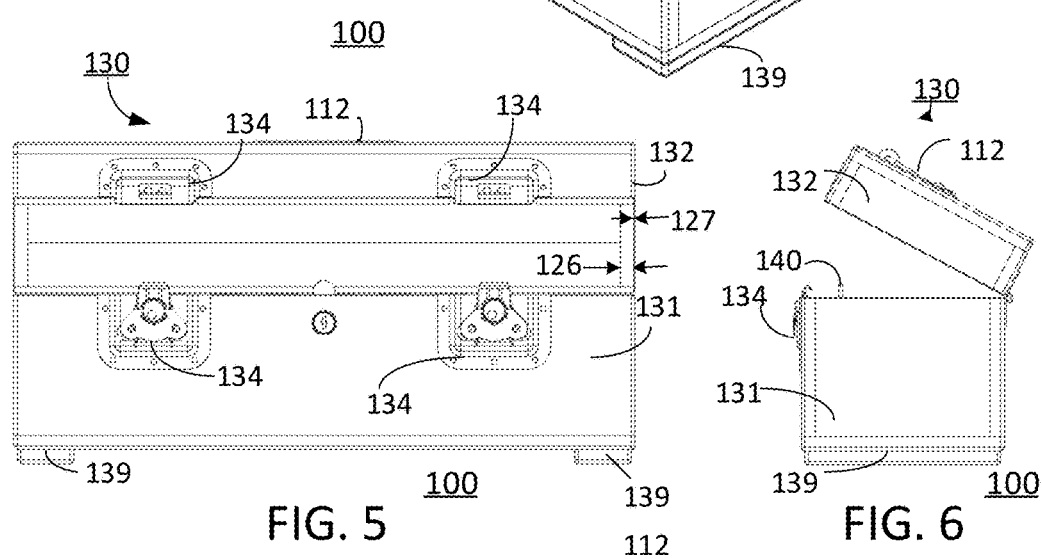
FIG. 5 is a front view with the lid open illustrating an elongated resilient stackable reusable container of the article and method of manufacture of the invention.
Figure 6:
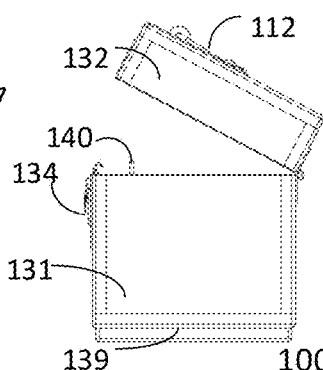
FIG. 6 is a side view illustrating an elongated resilient stackable reusable container of the article and method of manufacture of the present invention.
Figure 7:
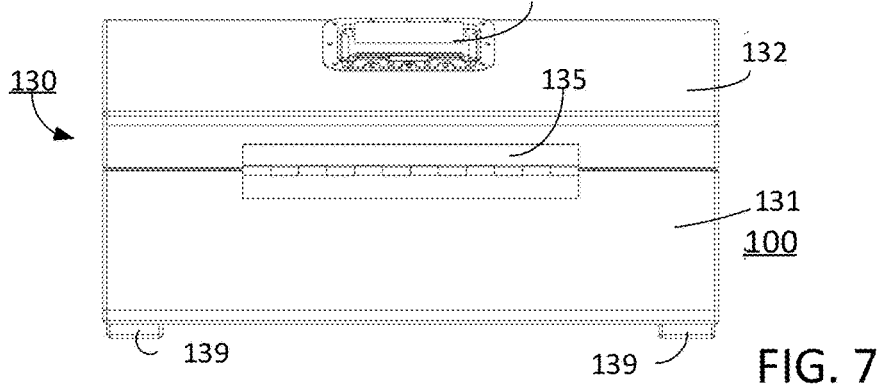
FIG. 7 is a rear view illustrating an elongated resilient stackable reusable container of the article and method of manufacture of the present invention.

As shown in FIGS. 4-7 and 8-13, for example, the fastener assembly 134 functions to join the base enclosure 131 and the lid enclosure 132. As shown in FIG. 4, an embodiment of the present invention the elongated reusable container 130 may include a latch 138 formed in the base enclosure 131 configured to operably connect and attach to a tab 137 formed in the lid enclosure 132. The latch 137 and tab 138 are part of the fastener assembly 134 a generally may be secured to a front side portion of the reusable container 130. Similarly as shown in FIG. 8, latch 137 and tab 138 are part of the fastener assembly 134 a generally may be secured to a front side portion of the reusable container 160. The reusable container 130 may be coated with the polyurea coating 115 which after spraying on the foam 103 portions the polyurea coating 115 hardens and provides structural support to the foam material 103. This manner a resilient reusable container 100 may be formed in many varied and different designs such as containers 110, 130 and 160, suitable for elongated articles such as hydraulic lines, fragile and delicate items, high-value objects such as aircraft engines being shipped in commerce, whereby disadvantages of the prior art are minimized, e.g. FOD, damage or corrosion due to environmental conditions.

As shown in FIG. 14, according to yet another embodiment of the present invention the reasonable container 100, and embodiments 110, 130 and 160, may utilize one or more foam inserts 165 with cutouts 166 to secure parts therein such that the parts are suspended during transportation whereby damage is reduced. Assembly kits present an unrivaled presentation and unparalleled organization, tracking, and build time optimization. Visual validation noticeably increases productivity and efficiency. Eliminate waste associated with current binning methods of part storage and delivery.

The reusable container 100 constructed according to embodiments herein using a sprayed on polyurea coating of a second polyurea layer portion 127 on first layer portion 126 of suitable materials 101 (e.g. sheets of cardboard 102, foam 103, plastic 104, wood 105, composite material, and lightweight metal materials 106) creates a product that is stronger, water resistant, lighter, safer and more durable than other products presently being used presently today in the packaging industry. Applicant has measured a cost savings of about 25% per reasonable container 100 as compared to conventional containers for the article and method of manufacture described and claimed herein, including the illustrated embodiments 110, 130 and 160, as shown in FIGS. 1-14. Furthermore, Applicant has measured a weight reduction of about 33% per reasonable container 100 as compared to conventional containers for the article and method of manufacture described and claimed herein, including the illustrated embodiments 110, 130 and 160, as shown in FIGS. 1-14. Moreover, the article of manufacture of the reusable container 100 advantageously is reusable so as to further reduce costs in a particular application or industry.

While certain configurations of structures have been illustrated for the purposes of presenting the basic structures of the present invention, one of ordinary skill in the art will appreciate that other variations are possible which would still fall within the scope of the appended claims. Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A modular container for use in transporting delicate and/or high-value items and objects, comprising:

a support frame comprising a first layer portion configured with a lid enclosure consisting of a panel assembled between a lid base framing portion and an upper lid framing portion, a base enclosure consisting of one or more wood portions interspersed with a base framing portion and an upper framing portion with a plurality of side portions connected in spaces between said one or more wood portions, said upper lid framing portion and said base framing portion thereby forming a void space to insert the item, said first layer portion further comprising a hinge connected to said base framing portion and said lid base framing portion, and a latch operably connected to said base framing portion and said one or more wood portions on a side of said support frame opposite said hinge to secure said lid enclosure to said base enclosure in adjacent relationship thereto, said first layer portion further having a handle disposed in at least one of said wood portions and/or said upper lid framing portion configured to assist in transporting the modular container, a second polyurea layer comprising a polyurea coating deposited in a dimension of about 0.025 to 0.125 inch thickness, said second polyurea layer being deposited on said first layer portion by spray application.

2. The modular container of claim 1 wherein said plurality of side portions, said panel of said lid enclosure are configured from foam.

3. The modular container of claim 2 said plurality of side portions are configured from one or more foam inserts extending into said void space, said one or more foam inserts having at least one cutout to suspend the item and/or object therein.

* * * * *